US012694638B2

(12) United States Patent　　　　　　(10) Patent No.:　US 12,694,638 B2

Colonna et al.　　　　　　　　　　　　(45) **Date of Patent:　*Jul. 28, 2026**

(54) GRADING SYSTEM AND A METHOD THEREOF

(71) Applicant: Quantitative Coin Grading LLC, Stanwood, MI (US)

(72) Inventors: Richard Colonna, Stanwood, MI (US); Frank Meyer, Milford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,483

(22) Filed: Mar. 18, 2024

(65) Prior Publication Data

US 2024/0221341 A1　　　Jul. 4, 2024

Related U.S. Application Data

(63) Continuation-in-part of application No. 18/526,594, filed on Dec. 1, 2023, now Pat. No. 12,556,796.

(60) Provisional application No. 63/429,988, filed on Dec. 3, 2022.

(51) Int. Cl.
　　*G06V 10/141*　　　(2022.01)
　　*G06T 7/00*　　　　(2017.01)

(52) U.S. Cl.
　　CPC .......... *G06V 10/141* (2022.01); *G06T 7/0002* (2013.01)

(58) Field of Classification Search
　　CPC ................ G06V 10/141; G06T 7/0002; G06T 2207/20081; G06T 2207/20084; G06T 7/0004

See application file for complete search history.

(56) References Cited

U.S. PATENT DOCUMENTS

| | | | |
|---|---|---|---|
| 3,349,612 A | 10/1967 | Sherman | |
| 4,191,472 A | 3/1980 | Mason | |
| 4,309,111 A | 1/1982 | Sobresky | |
| 4,811,040 A | 3/1989 | Madsen | |
| 4,899,392 A | 2/1990 | Merton | |
| 5,144,495 A | 9/1992 | Merton et al. | |
| 5,220,614 A * | 6/1993 | Crain | G06T 7/73 |
| | | | 382/136 |
| 6,643,666 B1 | 11/2003 | Kernz | |
| 9,767,163 B2 | 9/2017 | Kass et al. | |
| 11,176,651 B2 | 11/2021 | Liberatori, Jr. et al. | |
| 11,335,153 B1 | 5/2022 | Finley et al. | |

(Continued)

*Primary Examiner* — Yogesh K Aggarwal

(74) *Attorney, Agent, or Firm* — Oppenhuizen Law PLC; David L. Oppenhuizen

(57)　　　　　ABSTRACT

An imaging apparatus for obtaining images of an object from various orientations during different specific lighting conditions. The imaging apparatus includes an enclosed housing which blocks any exterior ambient light from entering the interior chamber. A vacuum table is positioned within the housing, and a camera is located within the housing and positioned above the vacuum table for capturing images of objects placed on the vacuum table. A light assembly is included which includes various different lights at different locations within the housing to illuminate and identify different features and flaws on an object placed on the vacuum table. A light intensity sensor is located within the housing which is configured to monitor the intensity of light from the light assembly. A controller is also provided which is configured to control the operation of the camera, the vacuum table, the light intensity sensor, and the lights in the light assembly.

18 Claims, 7 Drawing Sheets

(56)         References Cited

U.S. PATENT DOCUMENTS

| | | | |
|---|---|---|---|
| 2015/0131890 A1* | 5/2015 | Rourk | G07D 5/10 |
| | | | 382/136 |
| 2016/0187261 A1 | 6/2016 | Hager | |
| 2019/0114762 A1 | 4/2019 | Liberatori, Jr. et al. | |
| 2020/0101584 A1* | 4/2020 | Yoshida | B25B 11/005 |
| 2020/0312074 A1* | 10/2020 | Jagielinski | G07D 3/06 |
| | | | 453/4 |
| 2021/0065353 A1 | 3/2021 | Potter et al. | |
| 2022/0054672 A1* | 2/2022 | Chen | A61L 31/12 |
| 2022/0374947 A1 | 11/2022 | Sebastian | |
| 2023/0044043 A1 | 2/2023 | Johnson | |
| 2023/0127587 A1* | 4/2023 | Leibfritz | G01N 23/223 |
| | | | 378/44 |
| 2023/0222641 A1 | 7/2023 | Gordon | |

* cited by examiner

GRADING SYSTEM AND A METHOD THEREOF

BACKGROUND OF THE INVENTION

Field of the Invention

The present invention relates generally to a grading system for grading a coin. More particularly, the present disclosure pertains to a coin grading system that facilitates automatic grading of a coin and reduces human intervention.

Description of the Prior Art

Coin grading is the process of determining the grade or condition of a coin, and it is one of the key factors in determining a coin's collectible value. Coin collectors widely regard the Sheldon Coin Grading Scale as the most acceptable system for grading a collectible coin. The Sheldon Coin Grading Scale is a 70-point system used in the numismatic assessment of a coin's quality. A coin's grade is generally determined by seven criteria: strike, wear, contact marks, spots, luster, toning, and scratches.

Certification services exist in which coins are manually graded by professionals using simple tools like magnifying glasses and incandescent light bulbs. This grading is generally performed manually by experienced graders, and therefore coin grading is laborious, time intensive, and expensive. Moreover, this process involves shipping the coin to a grading company location and back, which also delays the coin grading process and introduces a possibility for loss or theft during shipping and delivery. Also, manual grading is subjective and even experts can disagree about the grade of a given coin. Therefore, the manual process of coin grading is expensive, untimely, and too subjective.

SUMMARY OF THE INVENTION

In one aspect of the disclosure, an imaging apparatus is provided which comprises: an enclosed housing defining a chamber, the housing configured to substantially block any exterior ambient light from entering the chamber; a rotatable turntable positioned within the housing; a camera located within the housing and positioned above the turntable, the camera being aimed downwardly along a vertical axis toward the turntable to capture a plurality of images of an object placed on the turntable; a light assembly including a first light, a second light, a third light, and a fourth light, each of the first light, the second light, the third light, and the fourth light being located within and mounted at various locations within the housing; the first light arranged proximate to the camera and oriented to project light downwardly to the turntable, thereby providing direct illumination onto an object placed on the turntable; the second light located at an elevated position relative to the turntable, the second light being mounted off-center within the housing and oriented at an angle to the vertical axis, the second light being a laser light and being positioned to project a laser line across a portion of an object placed on the turntable; the third light located at an elevated position relative to the turntable, the third light being mounted off-center within the housing and oriented at an angle to the horizontal axis, the third light being configured to project light at a shallow angle onto an object placed on the turntable; the fourth light includes a plurality of light units arranged around the turntable to encompass the turntable, the fourth light being located at an elevated position relative to the turntable and oriented to project light downwardly and centrally toward the turntable; a light intensity sensor located within the housing, the light intensity sensor being configured to monitor the intensity of light generated by the light assembly; and a controller configured in communication with and to control the operation of the camera, the turntable, the light intensity sensor, and the first light, the second light, the third light, and the fourth light of the light assembly.

Optionally, the imaging apparatus includes a shuttle table movably coupled to the housing and adapted to move between a first position outside the housing and a second position inside the chamber, the turntable being positioned on the shuttle table.

Optionally, the turntable includes a stepper motor configured to rotate the turntable about the vertical axis relative to the shuttle table.

Optionally, the controller includes a processor having an image analyzer to analyze the plurality of images.

Optionally, the controller is configured to control the first light, the second light, the third light, and the fourth light to provide one or more desired light conditions inside the chamber.

Optionally, the controller is configured to control the camera to capture images of an object on the turntable.

Optionally, the controller is configured to control the camera to capture images of an object on the turntable under the one or more desired light conditions.

Optionally, the controller is configured to control the turntable to selectively rotate the turntable and control the camera to capture images of an object on the turntable at various rotational positions.

Optionally, the controller is configured to control the turntable to selectively rotate the turntable and control the camera to capture images of an object on the turntable at various rotational positions under the one or more desired light conditions.

Optionally, the controller is configured to control the light intensity sensor to sense illumination levels within the chamber, and to adjust the light intensity output by the light assembly as necessary to achieve the one or more desired light conditions.

According to a second aspect of the disclosure, an imaging apparatus is provided which comprises: an enclosed housing defining a chamber, the housing configured to substantially block any exterior ambient light from entering the chamber; a vacuum table positioned within the housing; a camera located within the housing and positioned above the vacuum table, the camera being aimed downwardly along a vertical axis toward the vacuum table to capture a plurality of images of an object placed on the vacuum table; a light assembly including a first light, a second light, a third light, and a fourth light, each of the first light, the second light, the third light, and the fourth light being located within and mounted at various locations within the housing; the first light arranged proximate to the camera and oriented to project light downwardly to the vacuum table, thereby providing direct illumination onto an object placed on the vacuum table; the second light located at an elevated position relative to the vacuum table, the second light being mounted off-center within the housing and oriented at an angle to the vertical axis, the second light being a laser light and being positioned to project a laser line across a portion of an object placed on the vacuum table; the third light located at an elevated position relative to the vacuum table, the third light being mounted off-center within the housing and oriented at an angle to the horizontal axis, the third light being configured to project light at a shallow angle onto an object placed on the vacuum table; the fourth light includes a plurality of light units arranged around the vacuum table to encompass the vacuum table, the fourth light being located at an elevated position relative to the vacuum table and oriented to project light downwardly and centrally toward the vacuum table; a light intensity sensor located within the housing, the light intensity sensor being configured to monitor the intensity of light generated by the light assembly; and a controller configured in communication with and to control the operation of the camera, the vacuum table, the light intensity sensor, and the first light, the second light, the third light, and the fourth light of the light assembly.

Optionally, the imaging apparatus includes a shuttle table movably coupled to the housing and adapted to move between a first position outside the housing and a second position inside the chamber, the vacuum table being positioned on the shuttle table.

Optionally, the vacuum table includes an upper surface having a plurality of vacuum holes that are in fluid communication with a vacuum pump, whereby the vacuum pump is configured to draw air in from the vacuum holes to create a vacuum against any objects placed atop the vacuum table.

Optionally, the controller is configured to control the vacuum pump to secure objects in place atop the vacuum table.

Optionally, the controller is configured to control the camera to capture images of an object on the vacuum table.

Optionally, the controller is configured to control the camera to capture images of an object on the vacuum table under the one or more desired light conditions.

For a more complete understanding, reference is made to the following detailed description and accompanying drawings. In the drawings, like reference characters refer to like parts throughout the views in which:

DETAILED DESCRIPTION

Figure 1:
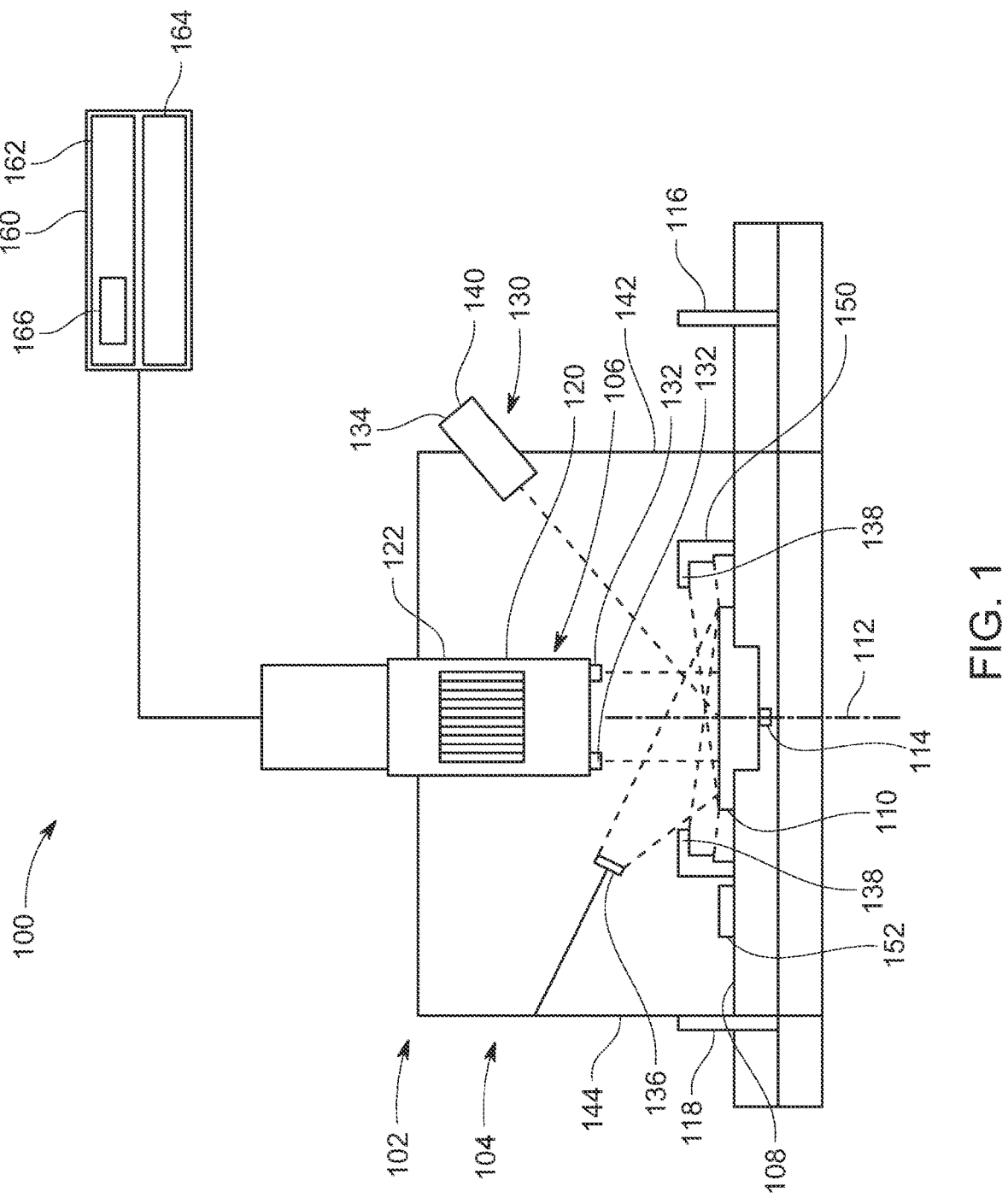
FIG. 1 illustrates a schematic view of a grading system having an imaging apparatus, in accordance with an embodiment of the disclosure.
Figure 2:
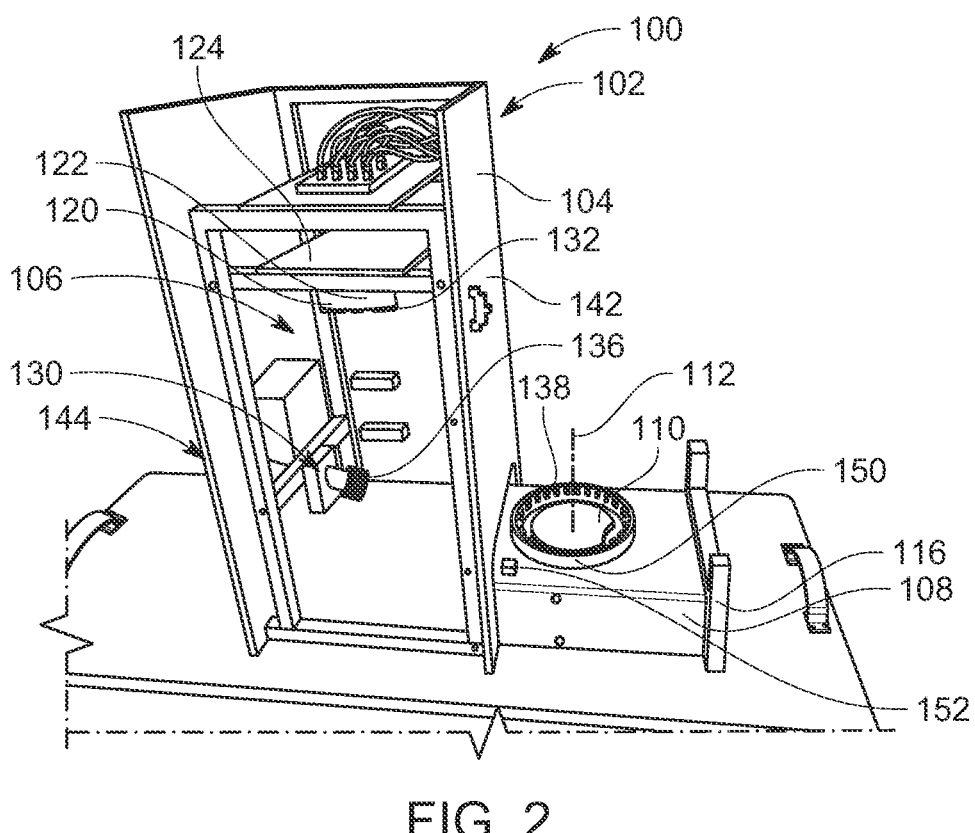
FIG. 2 illustrates a front perspective view of the imaging apparatus depicting a housing with a sidewall removed and depicting various components of the imaging apparatus with a shuttle table arranged at a first position, in accordance with an embodiment of the disclosure.
Figure 3:
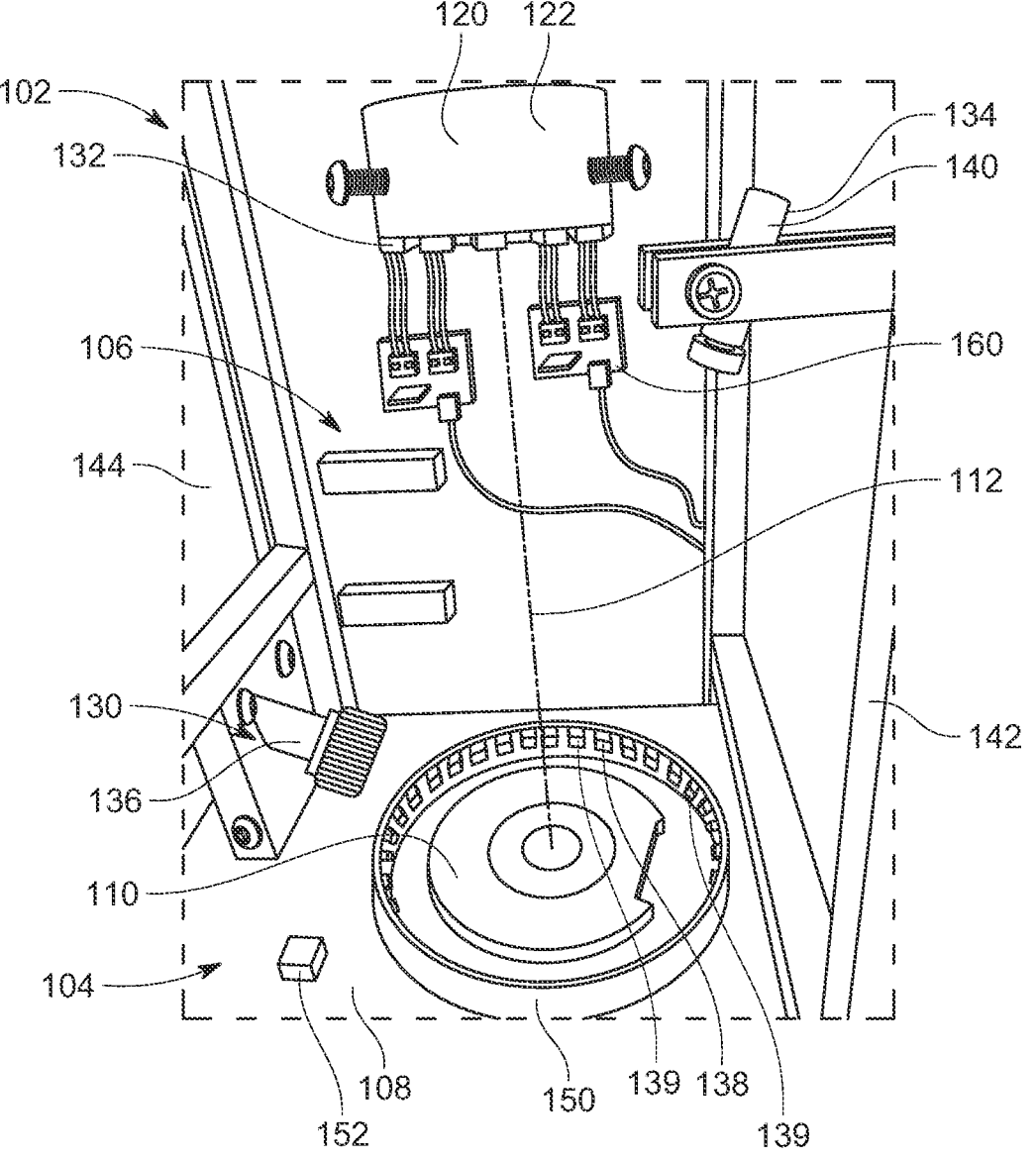
FIG. 3 illustrates a front perspective view of the housing with the shuttle table arranged inside the housing at a second position, in accordance with an embodiment of the disclosure.
Figure 4:
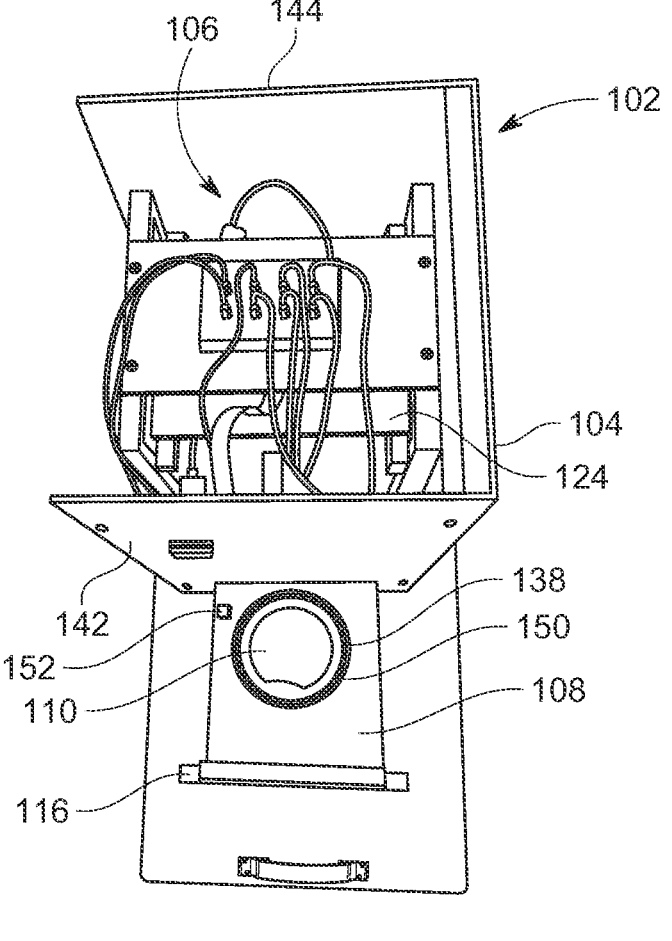
FIG. 4 illustrates a top perspective view of the imaging apparatus, in accordance with an embodiment of the disclosure.

Referring to FIG. 1, an exemplary grading system 100 is shown which includes an imaging apparatus 102 to gather images of a coin to enable the coin to be graded. The apparatus 102 includes a housing 104 defining a chamber 106, and a shuttle table 108 movably coupled to the housing 104 and adapted to move between a first position outside the housing 104 and a second position arranged inside the chamber 106. The housing 104 preferably comprises a plurality of walls, a ceiling, and a floor which cooperatively fully enclose and surround the chamber 106 to create a "dark room" in which lighting conditions can be fully controlled. The housing 104 is formed of a non-transparent and non-translucent material, and is free of windows or any openings which allow exterior light to enter into the chamber 106, whereby the housing 104 is configured to substantially block any exterior ambient light from entering the chamber 106. However, the housing 104 includes an access port (such as a door or the shuttle table 108) to allow a user to access the chamber 106 or to otherwise insert or remove an object (such as a coin) from the chamber 106. A coin (not shown) is imaged by moving the shuttle table 108 to the exterior first position, and placing the coin on the shuttle table 108.

The coin is placed inside the chamber 106 by moving the shuttle table 108 to the interior second position. The shuttle table 108 includes a rotatable turntable 110 mounted to the shuttle table 108. The turntable 110 is configured to rotate about a vertical axis 112 relative to the shuttle table 108. Preferably, the coin is positioned generally at the center of the turntable 110. In some embodiments, the apparatus 102 includes a motor 114, for example, a stepper motor 114, to rotate the turntable 110 about the vertical axis 112 relative to the shuttle table 108. Alternatively, shuttle table 108 can be omitted and the turntable 110 can be positioned directly on the floor of the housing 104, in which case the housing 104 can include a door to allow a user to access the chamber 106 for inserting or removing the coin from within the housing 104.

To enable the correct arrangement of the shuttle table 108 at the first position and the second position, the apparatus 102 optionally includes a first stopper 116 arranged on a first side of the housing 104 and connected to the housing 104, and a second stopper 118 arranged on a second side of the housing 104 and coupled to the housing 104. An end of the shuttle table 108 contacts the first stopper 116 at the first position, while an end of the shuttle table 108 contacts the second stopper 118 at the second position. Moreover, the first stopper 116 prevents a movement of the shuttle table 108 in a first direction beyond the first position, and the second stopper 118 prevents a displacement of the shuttle table 108 in the second direction, opposite to the first direction, beyond the second position.

The apparatus 102 also includes a camera 122 to capture various images of the coin under different orientations and lighting conditions. Any suitable type of high-resolution digital camera may be used, such as a Raspberry Pi HQ Camera. The camera 122 is mounted to a mounting structure, for example, a plate 124 arranged beneath the roof of the housing 104. The camera 122 is positioned above the turntable 110 when the shuttle table 108 is disposed at the second position to allow the camera 122 to gather images from directly above the coin. The camera 122 is oriented or aimed toward the turntable 110 to allow the camera to obtain images of any objects, such as a coin, placed atop the turntable 110. Optionally, a lens (not shown) may be coupled to the plate 124 between the camera 122 and the coin to provide a desired magnification of the coin positioned on the turntable 110. Alternatively, the lens can be integral to the camera 122 and may be operated/adjusted to provide an image having a desired optical magnification.

The apparatus 102 also includes a light assembly 130 having a first light 132, a second light 134, a third light 136, and a fourth light 138, to provide various lighting conditions for capturing desired images of the coin. Preferably, although not necessarily, the first light 132 is a dimmable LED RGB assembly, the second light 134 is a laser light, the third light 136 is a dimmable single LED, and the fourth light 138 is a dimmable LED RGB assembly.

It is to be understood that an LED RGB assembly is a commercially-available type of dimmable LED which is a LED module that can produce almost any color using three primary additive colors of red, green, and blue. The LED RGB assembly has a combination of three separate light-emitting diodes in a single assembly housed under a clear protective lens. Each of the separate light-emitting diodes is dimmable and wired via separate electric connections so that each of the light-emitting diodes can be selectively illuminated at varying intensities, thereby allowing a user to selectively determine the color and intensity of light being illuminated by each of LED RGB assemblies.

As shown, the first light 132 is a central light arranged proximate to and coupled to the mounting structure 124, and arranged proximate to and/or surrounding the camera 122 to project or aim light downwardly so as to directly illuminate the coin with a dome/cylindrical-shaped light of high intensity from above the coin. Preferably, the first light 132 includes one or more LEDs. The high intensity light of the first light 132 reflects various defects of the coin to the camera 122, allowing the camera 122 to capture one or more images of the coin with defects.

Furthermore, the second light 134 is a laser light 140 mounted off-center to a sidewall 142 of the housing 104 and located at an elevated position relative to the turntable 110. The second light 134 is arranged or oriented at an angle to the vertical axis 112 such that a laser light is emitted at a desired angle from the vertical axis 112 and illuminates a surface of the coin positioned on the turntable 110. Preferably the laser light projected onto the turntable 110 is a laser line which extends across a portion of the coin. As the laser light is directed downwardly to the coin, any contoured surface (i.e., variation in depth) of the coin appears distorted, for example, curved or ragged, from the perspective of the camera 122. This will result in images having pixel shifts, which processing software can use to calculate the distance of every point along the laser line, which can then be compared to known sample data. Optionally, the second light 134 may project a laser crosshair to focus the laser light 140 at the center of the turntable 110 and/or to help position the coin on the turntable 110.

The third light 136 is arranged to provide a shallow angle dark field illumination of the coin positioned on the turntable 110. To enable the shallow angle illumination of the coin, the third light 136 is mounted off-center to a sidewall 144 of the housing 104 and is arranged or oriented at an angle to the vertical axis 112 such that the third light 136 projects light at a desired angle from the vertical axis 112 and illuminates a surface of the coin positioned on the turntable 110 at a shallow angle on the coin, preferably between 10 degrees to 15 degrees from a horizontal plane. Under the shallow angle light projected by the third light 136, any surface features like contact marks and gauges reflect the light to the camera 122 such that these surface features brightly reflect light and are distinguishable in the images taken by the camera 122 under illumination from the third light 136. Preferably, the third light 136 includes one or more LEDs.

Additionally, the fourth light 138 is arranged to provide a diffuse light environment for imaging the coin. The fourth light 138 is mounted to a wall 150 which extends vertically upward from an upper surface of the shuttle table 108 or the floor of the housing 104, and the fourth light 138 is arranged around the turntable 110 to encompass the turntable 110 in a generally circular manner. The fourth light 138 projects its light downwardly and centrally toward and across the coin, thereby surrounding the turntable 110 and providing diffused illumination entirely around the coin so that any surface features like dust, scuffs, or fingerprints can be seen. As shown, the fourth light 138 preferably includes a plurality of light units 139, for example, RGB LEDs, mounted on the inner surface of the wall 150 and disposed 360 degrees around the turntable 110. These LEDs direct the light on the coin at a shallow angle and illuminate the area of the turntable 110, including the coin.

The apparatus 102 also includes at least one light intensity sensor 152 located within the housing configured to monitor the intensity of light generated by the one or more lights and positioned proximate or next to the turntable 110. The light intensity sensor 152 is provided to measure the light intensity in order to illuminate the coin with a desired light intensity. Any suitable type of light intensity sensor which is well known in the art can be used, including an Aceirmc BH1750 Light Sensor. The apparatus 102 also includes a controller 160, for example, a Raspberry® controller to control the imaging of the coin and hence various components of the apparatus 102. In particular, the controller 160 uses the light intensity sensor 152 to measure the light intensity within the chamber 106, and then adjust the illumination levels as desired by increasing or decreasing the light output of the various lights of the light assembly 130.

To that end, the controller 160 is arranged in communication with the first light 132, the second light 134, the third light 136, the fourth light 138, the camera 122, the light intensity sensor 152, and the stepper motor 114, and controls one or more components of the apparatus 102 to obtain desired images of the coin. The controller 160 may include a processor 162 for executing specified instructions, which controls and monitors various functions associated with the apparatus 102. The processor 162 may be operatively connected to a memory 164 for storing instructions related to the control of the apparatus 102 and components of the apparatus 102.

The memory 164 as illustrated is integrated into the controller 160, but those skilled in the art will understand that the memory 164 may be separate from the controller 160 but onboard the apparatus 102, and/or remote from the controller 160 and the apparatus 102, while still being associated with and accessible by the controller 160 to store information in and retrieve information from the memory 164 as necessary during the operation of apparatus 102.

Although the processor 162 is shown, it is also possible and contemplated to use other electronic components such as a microcontroller, an application specific integrated circuit (ASIC) chip, or any other integrated circuit device. Moreover, the controller 160 may refer collectively to multiple control and processing devices across which the functionality of the apparatus 102 may be distributed. For example, the stepper motor 114, the first light 132, the second light 134, the third light 136, the fourth light 138, the light intensity sensor 152, and the camera 122 may each have one or more controllers that communicate with the controller 160.

The processor 162 is configured to receive an input corresponding to an identity of the coin, for example, the type of coin, year of manufacturing of the coin, a value of the coin, etc., from the user, and controls the various components of the apparatus 102 for imaging and collects a plurality of images of the coin based on the received information of the coin from the user. It may be appreciated that instructions or steps to be followed and carried out for imaging any particular coin may be stored inside the memory 164 corresponding to each of the coins, and the processor 162 may identify and access the information based on the information received from the user related to the identity of the coin.

To enable a user to input the necessary information related to the identity of the coin, the apparatus 102 i.e., the system 100, may include a user interface (not shown). In an embodiment, the user interface may be a web-based application installed on a computing device, for example, a mobile phone, a laptop, a tablet, etc., and the processor 162 may receive the necessary information related to the coin from the web-based application via a remotely located server or the computing device in a scenario in which the computing device may be connected with the apparatus via communication interface, for example, USB wire mode. In some embodiments, the controller 160 may determine or collect information about the coin based on initial images collected, and then control the components of the imaging apparatus 102 accordingly. The controller 160 (i.e., processor 162) is also configured to perform a calibration process to calibrate the apparatus 102 for imaging based on the identity of the coin. In an embodiment, the calibration process is performed automatically or by directing the user to perform certain steps.

After calibration or otherwise, the processor 162 is configured to control the camera 122 or the lens to adjust the magnification of the camera/lens 122 to a desired magnification level. In some embodiments, the processor 162 is configured to adjust the magnification during the imaging of the coin. As discussed above, the controller 160, i.e., the processor 162, is configured to control the light assembly 130 (i.e., one or more of the first light 132, the second light 134, the third light 136, and the fourth light 13) to illuminate the coin at a desired light intensity. Preferably the light intensity is controlled based on input received from the light intensity sensor 152.

Preferably the processor 162 may illuminate the coin with one or more lights at a time (although not all of the lights at once), and captures the desired images of the coin at desired magnifications. Furthermore, the processor 162 may control the turntable 110 by controlling the stepper motor 114 to rotate the coin to capture the magnified images of the coin or portions of the coin at various angular positions. In some embodiments, the processor 162 may capture the images of the coin with more than one light illuminating the coin. It may be appreciated that the captured images may be stored inside the memory 164 for lateral retrieval. Moreover, the images may be stored with an identifier that may facilitate identification of the light conditions and turntable 110 rotational position under which the image was taken and the identity of the coin.

In some embodiments, upon completion of the imaging of the coin, the images are shared with a server for further processing of the images and determining or assigning a grade to the coin. As such, the images may be uploaded on a web-based application according to some embodiments. Alternatively, the images may be shared with the server for further processing via email. Alternatively, the apparatus 102 may include a communication device and the images are stored directly to the cloud, i.e., a remote server. In some embodiments, processing the images may be performed by the processor 162. It may be appreciated that processing the images at the remote server is performed in a manner similar to processing the images by the processor 162.

To process the images, the processor 162 may include an image analyzer 166 to analyze the captured images and identify various defects associated with the coin from the captured images. In an embodiment, the image analyzer 166 may stitch various images together to correctly identify the defects of the coin. Upon identifying the defects of the coin, the processor 162 may compare the defects with the various defects stored inside a database and determine a level or intensity of the defects. The processor 162 may objectively determine a level/intensity of each of the defects, and then objectively assign a grade to the coin. In some embodiments, the processor 162 may include a trained machine learning model to determine the level/intensity of defects and grade the coin accordingly. In an embodiment, the machine learning model may be a neural network-based model, a random forest-based model, a support vector machines-based model, a k-nearest neighbors algorithm-based model, a symbolic regression-based model, or any other such model known in the art. In some embodiments, the image analyzer 166 may also use a machine learning model to process the captured images to identify one or more defects of the coin. In this manner, the system 100 facilitates an objective grading of the coin.

Figure 5:
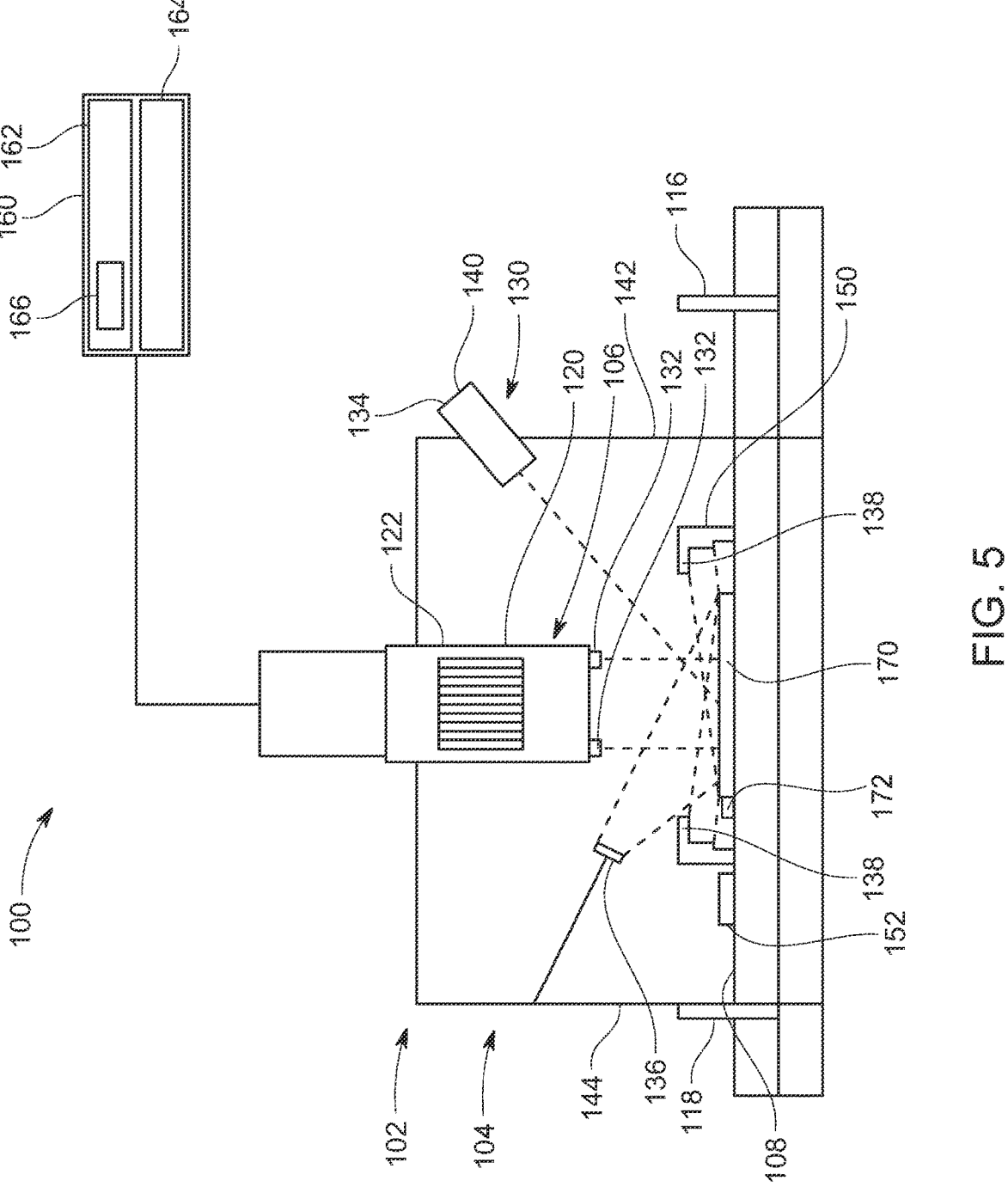
FIG. 5 illustrates a schematic view of a grading system having an imaging apparatus, in accordance with a second embodiment of the disclosure having a vacuum table.
Figure 6:
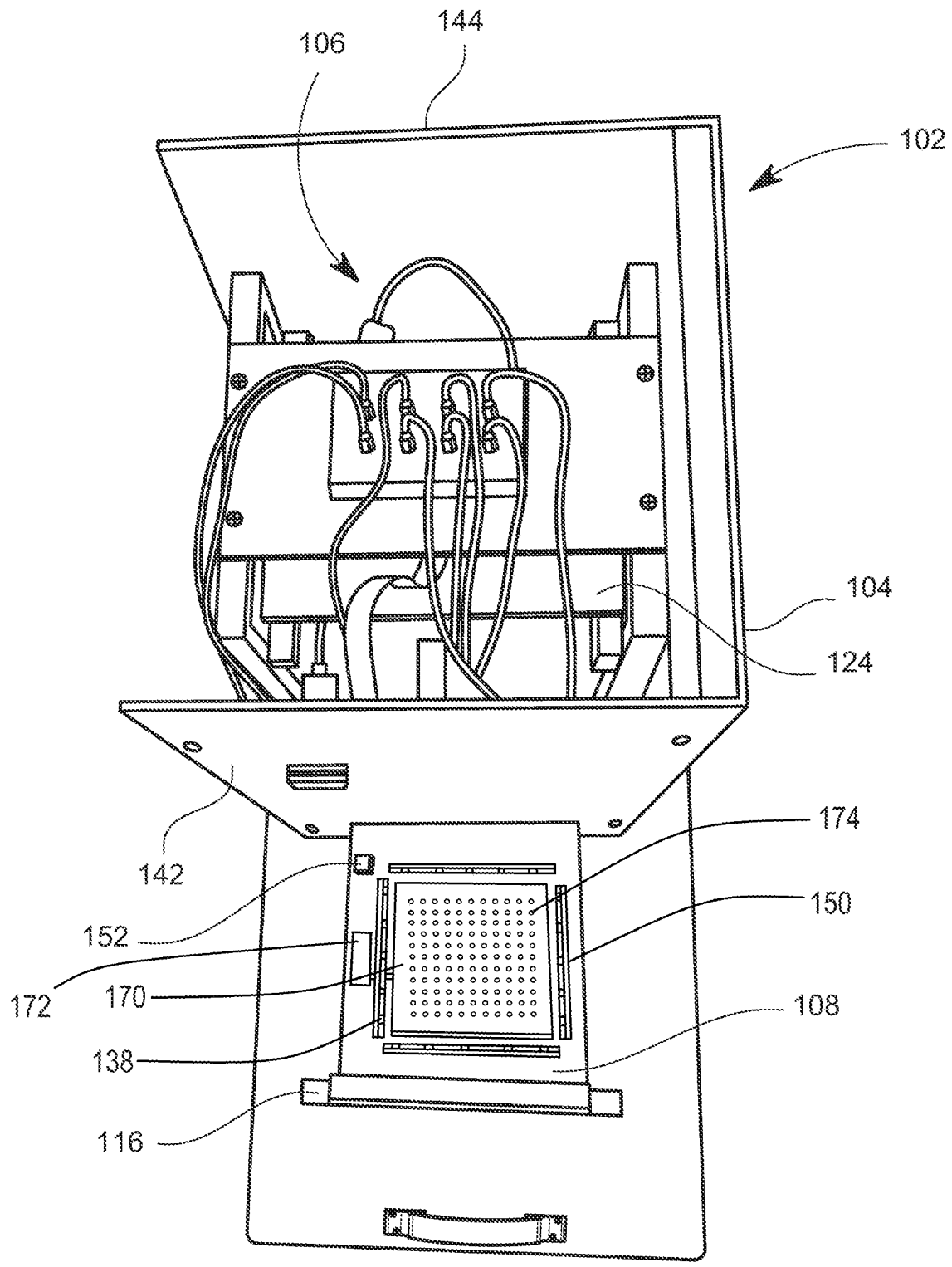
FIG. 6 illustrates a top perspective view of the imaging apparatus, in accordance with the second embodiment of the disclosure.
Figure 7:
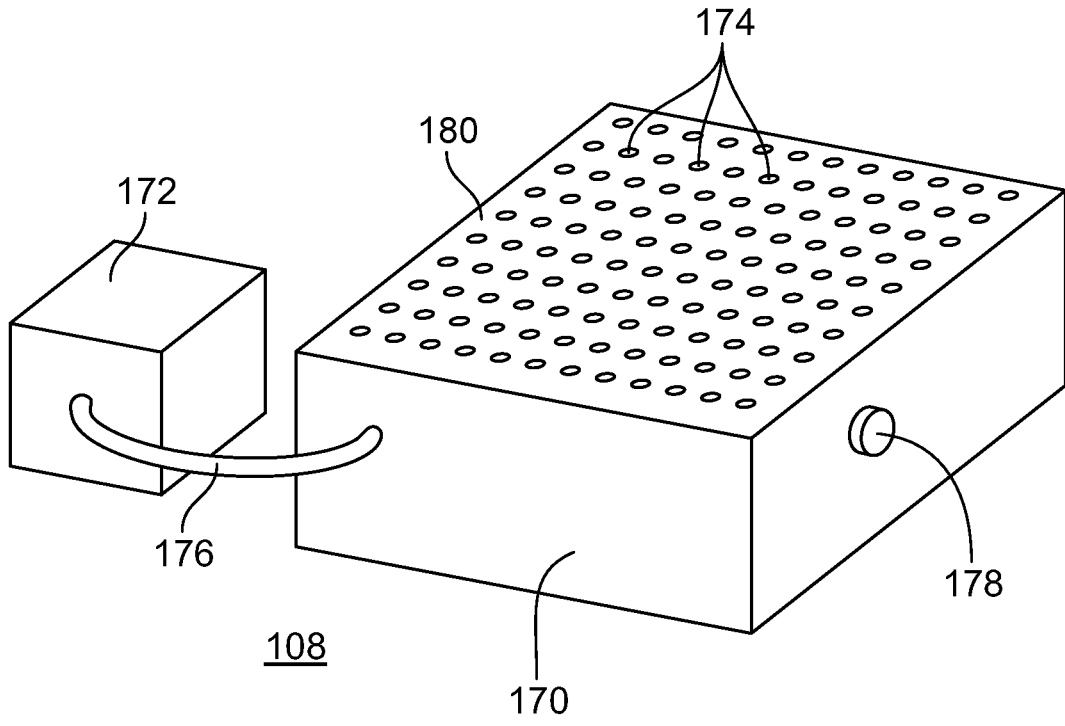
FIG. 7 illustrates an enlarged partial view of the vacuum table positioned atop the shuttle table.

According to a second embodiment of the disclosure, and as shown in FIGS. 5-7, the imaging apparatus 102 can include a vacuum table 170 instead of, or in addition to, the turntable 110. The vacuum table 170 is configured to apply a vacuum against any objects placed atop the vacuum table 170 in order to assist with holding the objects securely in position. It is to be appreciated that this is particularly useful when the object is relatively light or prone to shifting, such as a bank note, a stamp, a sports card, and so forth. Similar to the turntable 110, the vacuum table 170 is positioned within the housing 104 and sits atop the shuttle table 108. The vacuum table 170 is similarly located on the shuttle table 108 to allow the camera 122 to obtain images of an object placed on top of the vacuum table 170. And additionally, the light assembly 130 and its associated lights can illuminate the object on the vacuum table 170 in the same manner as is done for objects on the turntable 110.

The vacuum table 170 includes an upper surface 180 having a plurality of vacuum holes 174 that are in fluid communication with a vacuum pump 172. The vacuum pump 172 is configured to draw air in from the vacuum holes 174 to create a vacuum against any objects placed on the upper surface 180 of the vacuum table 170. The vacuum pump 172 can optionally be placed on the shuttle table 108 along with the vacuum table 170, or the vacuum pump 172 can be located elsewhere, such as outside the housing 104. Preferably, and as shown in FIGS. 5 and 6, the vacuum pump 172 is positioned atop the shuttle table 108 and proximate to the vacuum table 170. The vacuum pump 172 can be attached directly to the vacuum table 170, or it can alternatively be connected to the vacuum table 170 via a vacuum tube 176. Optionally, the vacuum table 170 can also include a vacuum relief valve 178 to allow air to flow to the vacuum holes 174 to relieve the vacuum and allow an object on the vacuum table 170 to be easily removed therefrom.

The vacuum table 170 can include a plurality of internal channels (not shown) to fluidly connect the vacuum pump 172 and the vacuum holes 174. Alternatively, the vacuum table 170 can include a large internal void, such as having a hollow center portion, to which both the vacuum pump 172 and the vacuum holes 174 are fluidly connected. The controller 160 is configured to control the vacuum pump 172 to secure objects in place atop the vacuum table 170.

Although the system 100 has been described hereinabove for particular use with grading a coin, it is to be appreciated that the system 100 is suitable for use with any number of other objects, such as collectible sports cards, collectible stamps, or any other type of object for which it is desirable to obtain photographic images under various lighting conditions and/or orientations.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. An imaging apparatus comprising:
an enclosed housing defining a chamber, the housing configured to substantially block any exterior ambient light from entering the chamber;
a vacuum table positioned within the housing;
a camera located within the housing and positioned above the vacuum table, the camera being aimed downwardly along a vertical axis toward the vacuum table to capture a plurality of images of an object placed on the vacuum table;
a light assembly including a first light, a second light, a third light, and a fourth light, each of the first light, the second light, the third light, and the fourth light being located within and mounted at various locations within the housing;
the first light arranged proximate to the camera and oriented to project light downwardly to the vacuum table, thereby providing direct illumination onto an object placed on the vacuum table;
the second light located at an elevated position relative to the vacuum table, the second light being mounted off-center within the housing and oriented at an angle to the vertical axis, the second light being a laser light and being positioned to project a laser line across a portion of an object placed on the vacuum table;
the third light located at an elevated position relative to the vacuum table, the third light being mounted off-center within the housing and oriented at an angle to the horizontal axis, the third light being configured to project light at a shallow angle onto an object placed on the vacuum table;
the fourth light includes a plurality of light units arranged around the vacuum table to encompass the vacuum table, the fourth light being located at an elevated position relative to the vacuum table and oriented to project light downwardly and centrally toward the vacuum table;
a light intensity sensor located within the housing, the light intensity sensor being configured to monitor the intensity of light generated by the light assembly; and
a controller configured in communication with and to control the operation of the camera, the vacuum table, the light intensity sensor, and the first light, the second light, the third light, and the fourth light of the light assembly.

2. The imaging apparatus of claim 1 including a shuttle table movably coupled to the housing and adapted to move between a first position outside the housing and a second position inside the chamber, the vacuum table being positioned on the shuttle table.

3. The imaging apparatus of claim 2 including a vacuum pump, and wherein the vacuum table includes an upper surface having a plurality of vacuum holes that are in fluid communication with the vacuum pump, the vacuum pump being configured to draw air in from the vacuum holes to create a vacuum against any objects placed atop the vacuum table.

4. The imaging apparatus of claim 1 including a vacuum pump, and wherein the vacuum table includes an upper surface having a plurality of vacuum holes that are in fluid communication with the vacuum pump, the vacuum pump being configured to draw air in from the vacuum holes to create a vacuum against any objects placed atop the vacuum table.

5. The imaging apparatus of claim 1 wherein the controller includes a processor having an image analyzer to analyze the plurality of images.

6. The imaging apparatus of claim 1 wherein the controller is configured to control the first light, the second light, the third light, and the fourth light to provide one or more desired light conditions inside the chamber.

7. The imaging apparatus of claim 1 wherein the controller is configured to control the camera to capture images of an object on the vacuum table.

8. The imaging apparatus of claim 6 wherein the controller is configured to control the camera to capture images of an object on the vacuum table under the one or more desired light conditions.

9. The imaging apparatus of claim 4 wherein the controller is configured to control the vacuum pump to selectively draw a vacuum against an object on the upper surface of the vacuum table.

10. The imaging apparatus of claim 1 including a vacuum pump being configured to apply a vacuum to the vacuum table.

11. The imaging apparatus of claim 1 wherein the controller is configured to control the light intensity sensor to sense illumination levels within the chamber, and to adjust the light intensity output by the light assembly as necessary to achieve the one or more desired light conditions.

12. The imaging apparatus of claim 10 wherein the controller is configured to control the light intensity sensor to sense illumination levels within the chamber, and to adjust the light intensity output by the light assembly as necessary to achieve the one or more desired light conditions.

13. The imaging apparatus of claim 1 wherein the first light is a LED RGB assembly.

14. The imaging apparatus of claim 1 wherein the second light is a laser light.

15. The imaging apparatus of claim 1 wherein the third light is a dimmable single LED.

16. The imaging apparatus of claim 1 wherein the fourth light is a LED RGB assembly.

17. The imaging apparatus of claim 1 wherein first light and the fourth light are LED RGB assemblies, the second light is a laser light, and the third light is a dimmable single LED.

18. The imaging apparatus of claim 1 wherein the first light and the fourth light are LED RGB assemblies.

\* \* \* \* \*